Figure 1:
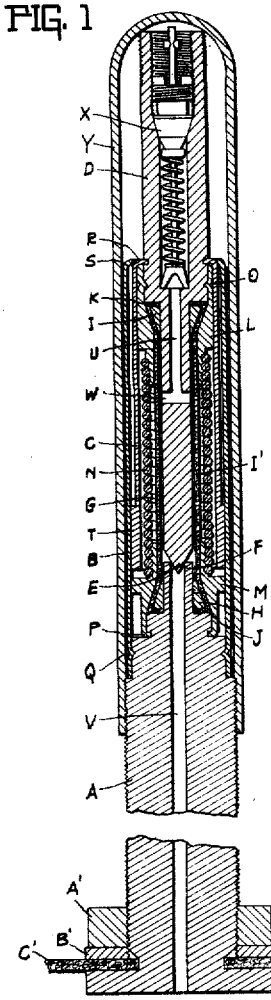

C. B. EARNHEART.
COMPRESSED AIR VALVE AND GAGE.
APPLICATION FILED MAY 11, 1916.

1,305,262.

Patented June 3, 1919.

INVENTOR
CHAUNCEY B. EARNHEART.
BY
Lockwood & Lockwood
ATTORNEYS

UNITED STATES PATENT OFFICE.

CHAUNCEY B. EARNHEART, OF INDIANAPOLIS, INDIANA, ASSIGNOR TO SAFETY FIRST DEVICES COMPANY, OF INDIANAPOLIS, INDIANA, A CORPORATION.

COMPRESSED-AIR VALVE AND GAGE.

1,305,262.   Specification of Letters Patent.   Patented June 3, 1919.

Application filed May 11, 1916. Serial No. 96,742.

*To all whom it may concern:*

Be it known that I, CHAUNCEY B. EARNHEART, a citizen of the United States, and a resident of Indianapolis, county of Marion, and State of Indiana, have invented a certain new and useful Compressed-Air Valve and Gage; and I do hereby declare that the following is a full, clear, and exact description thereof, reference being had to the accompanying drawings, in which like letters refer to like parts.

The object of this invention is to make a satisfactory and practical construction of a pressure gage permanently associated with the valve through which air or other fluid under pressure is introduced into a pneumatic tire, tank or other receptacle. In this invention a valve and pressure gage are combined into one article or device and arranged so that the back pressure of the fluid in the tire, tank or other receptacle will act directly on the gage and cause it to indicate the pressure.

The chief feature of the invention herein consists in providing positive means besides the usual check valve in such devices for preventing any escape of the air from the tire through this device. This consists of a valve in the nature of a needle valve adapted to close the passage through the valve stem and to be held in closed position by the dust cap, and while said closure is maintained, that is while the dust cap is in place, the check valve is relieved from the pressure or service. The check valve is of service only while the dust cap is removed.

Another feature of this invention consists in the means for mounting the expansible gage member or sleeve and associated parts at the valve stem A so as to permit expansion or contraction and also serve as a medium through which the air passes to the valve stem from the parts of the device which expand and contract. This connection consists of a rubber or elastic tube which is securely connected at one end to the valve stem and at its other end to the movable portion of the device: and said tube forms an air tight chamber through which the air passes and said tube also surrounds and incloses the needle valve rod which, after the tire has been filled, effectually closes the air passage through the valve stem. In addition to the foregoing, there are means for securing the ends of said rubber tube to said parts so they will not separate by reason of the back air passage. In fact the greater the back air pressure, or the greater the elongation of the rubber tube, the more securely are its ends held in place.

Figure 2:
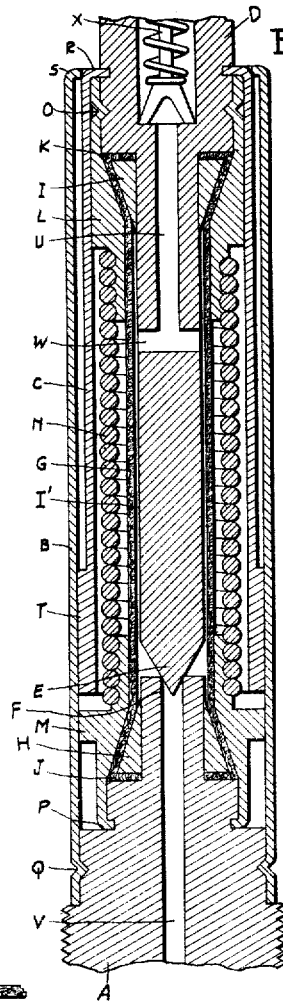
Figure 3:
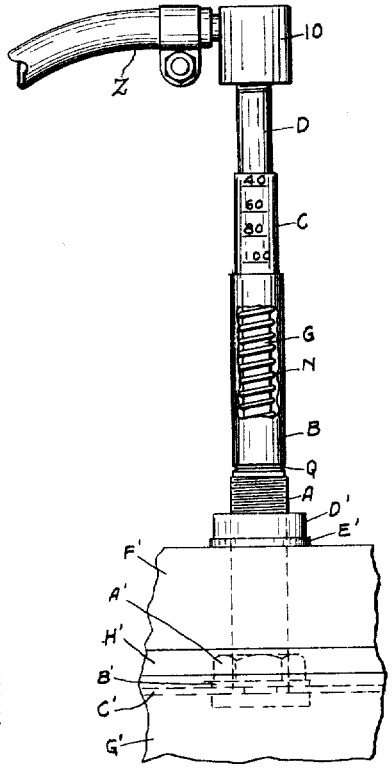
Figure 4:
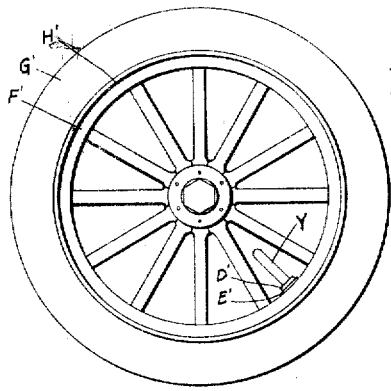

The full nature of the invention will be understood from the accompanying drawings in the following description and claims:

In the drawings, Figure 1 is a central longitudinal section of the device and the portion of a tire with which it is united, the parts of the device being shown in their normal position. Fig. 2 is the same as the middle portion of Fig. 1 shown on a larger scale. Fig. 3 is a side elevation of the device while the tire is being inflated, a portion of the air tube and wheel rim being shown in side elevation. Fig. 4 is an elevation of an automobile wheel when said tire is inflated.

A valve stem A externally threaded is inserted through the inner tube C' and has a head on its inner end and the stem is secured to the inner tube by a washer B' and nut A'. The valve stem extends through the rim F' of the wheel and on the outside of the rim there is a washer E' and a nut D' screws on the stem against the rim for securing the valve stem securely in place on the wheel. G' is the outer casing of the tire. H' is a metal clencher rim and may be demountable if desired.

The valve stem is provided with a simple air passage V of relatively small diameter as shown in Fig. 1, and upon the outer portion of this stem the dust cap Y is screwed as usual. The outer end of the air passage V is normally closed by the tapering inner end of a needle valve rod E which has an integral tubular outer end member D which latter is externally threaded at its outer end. The coupling 10 on the air hose Z leads from a pump or pressure tank which is not shown. Within the tubular member D the usual valve X is located as shown in Fig. 1. A reduced passage U leads from the tubular member D through the outer portion of the needle valve rod E and discharges laterally in opposite directions at W into a chamber I' which surrounds the rod E and is within the rubber or flexible tube G. The outer end of the tube G surrounds and embraces a conical wedge I which surrounds the valve rod E at its outer end adjacent to the tubular member D. Said conical wedge I fits within and cooperates with a conical seat in the outer end of a sleeve L which is secured to the member D by an inward crimp O fitting in a corresponding recess around said member D as shown in Fig. 2.

The crimp O is made by a proper tool after the sleeve L is put in place on the member D and forced toward the member D so as to forcibly crowd the wedge I in the seat and thus very strongly secure the outer end of the rubber tube G between the wedge I and the member D as shown at K in Fig. 2.

The inner end of the rubber tube G is secured to the outer end of the valve stem A in the same manner that the outer end of the rubber tube is secured in place. The extreme outer end of the valve stem A has a reduced portion F on which a conical wedge H similar to the wedge I is located and the inner end of the rubber tube G is stretched over the wedge H, and between the wedge H and the body of the valve stem A, as shown at J. A sleeve M is secured to the outer end portion of the valve stem A as shown in Fig. 2 by its extreme inner end being crimped as it is put in place into a corresponding annular groove as at P. Said sleeve M has a tapering seat for the wedge H and it is forced toward the valve stem A while assembling the parts so as to secure the rubber tube securely in place between the sleeve and the wedge.

A tension spring N is mounted on the adjacent ends of the sleeves L and M. Said spring is a close spirally wound spring, the ends of the sleeves are threaded so that the end of the spring can screw thereon and be held thereby.

A gage sleeve C is secured at its upper end to the member D by being crimped into a groove at R, but this connection is so loose that the sleeve C can turn on the member D. As shown in Fig. 3 the sleeve C has gage marks and numerals thereon for indicating the pressure of the air within the tire. Such pressure is indicated by the numeral nearest the outer end of the casing B, thus in Fig. 3 the pressure is slightly more than 100.

After the portions described have been assembled the casing B is put over the same in the position shown in Fig. 2 and is secured to the valve A by crimping same in the groove in the valve stem as shown in Q.

The upper end of the casing B has bent in flanges S which overhang and rest in the path of shoulders T on the sleeve C, said flanges and shoulders limiting the outward movement of the sleeve C.

The operation is as follows:

To charge a tire the dust cap Y is removed and the air tube Z with the coupling 10 is secured to the outer member D as shown in Fig. 3. The air from the tube Z goes through the passage U and the outlets W therefrom into the chamber I' within the rubber tube G and then the pressure of the air within said rubber tube will expand said rubber tube longitudinally. That is the air will force the member D outward away from the tire which will lift the needle valve at the inner end of the rod E, and enable the air to pass freely through the passage V into the tire. When this occurs the spring U will be elongated as indicated in Fig. 3. The sleeve C will move outward in the part B, but the casing B will not have any outward movement for it is secured to the valve stem A.

As the air pressure in the tire increases the back pressure thereof will force the rod E and member D outward still farther, thus more and more stretching the rubber tube G and the spring N and such outward movement of the sleeve C will successively expose the gage numerals thereon above the casing B and disclose the same as shown in Fig. 3 when the gage moves outward until the desired pressure is indicated and that will indicate the pressure of the air within the tire. The air through the coupling 10 is then turned off, the hose Z disconnected from the member D and the dust cap Y replaced and screwed down on the valve stem A until the outer end of the dust cap by its engagement with the outer end of the member D will return the parts to their normal positions, and force the needle valve E down so as to securely close the outer end of the passage V through the valve stem A as shown in Figs. 1 and 2. Then the parts will be in compact form and the air will be held from escaping through the gage by means of the needle valve E being held down by the dust cap as well as by the usual valve.

This is an important feature of the invention for it is well known that the valve or air check X becomes worn or affected so as to leak, but all possible leakage is prevented by the needle valve E being held down positively on its seat by the dust cap Y. In fact the only practical use of the valve X in this device is after the dust cap has been removed for the purpose of charging the tire; then the valve X prevents the air escaping from the tire.

It may be noted that the rubber tube G may be made from rubber tubing of standard character by merely cutting it in sections of desired length.

The invention claimed is:

1. The combination of an air valve stem with an air passage therethrough and a valve for opening and closing the passage through the valve stem, a spring tending to close said valve, an elastic air tight tube secured at its inner end to the valve stem and surrounding said valve and at its outer end secured thereto so that the air under pressure for charging the tire will enter the chamber within said tube and open said valve by overcoming the tension of said spring, and a dust cap adapted to screw on said stem and hold the valve in closed position.

2. The combination of an air valve stem with an air passage therethrough and an elastic air tight tube secured at the inner end to the said valve stem, means for introducing air under pressure into and through said tube for charging the tire, a valve carried by said tube for opening and closing the passage through the valve stem so that as the tube is expanded and lengthened by the air pressure it will open the valve, a tension spring for closing said valve against low air pressure, and a dust cap adapted to screw on said stem and hold the valve in closed position.

3. The combination of an air valve stem with an air passage therethrough and an outer member having on its inner end a valve for opening and closing the passage through the said valve stem, the outer portion of said member having a passage therethrough which opens laterally before reaching the end of the valve portion of said member, an elastic imperforate tube with its inner end secured to the valve stem and its outer end secured to said member beyond the inner outlet end of the passage through said member so as to form an air chamber within said tube and around the valve and enable the air under pressure entering said tube to open the valve by elongating the tube, and releasable means for positively holding said valve closed.

4. The combination of an air valve stem with an air passage therethrough and an outer member having on its inner end a valve for opening and closing the passage through the valve stem, the outer portion of said member having a passage therethrough which opens laterally before reaching the valve end of said member, an elastic imperforate tube with its inner end secured to the valve stem and its outer end secured to said member beyond the inner outlet end of the passage through said member so as to form an air chamber within said tube and around the valve and enable the air under pressure entering said tube to open the valve by elongating the tube, releasable means for positively holding said valve closed, and a check valve in the passage in the outer portion of said outer member.

5. The combination of an air valve stem with an air passage therethrough and an outer member having on its inner end a valve for opening and closing the passage through the valve stem, the outer portion of said member having a passage therethrough which opens laterally before reaching the valve end of said member, an elastic imperforate tube with its inner end secured to the valve stem and its outer end secured to said member beyond the inner outlet end of the passage through said member so as to form an air chamber within said tube and around the valve to enable the air under pressure entering said tube to open the valve by elongating the tube, a check valve in the passage in the outer portion of said outer member, and a dust cap which screws on said valve stem and incloses said outer member and engages its outer end so as to hold the valve at the inner end of said member positively closed.

6. The combination of an air valve stem with an air passage therethrough and a reduced outer end on said stem, an outer member having a valve at the inner end thereof for opening and closing the passage through the valve stem and having a passage through the outer portion thereof which opens laterally before reaching the inner portion of said member, conical wedges on the reduced ends of the valve stem and said outer member outward beyond the discharge end of the passage in said outer member, sleeves on the ends of the valve stem and outer member and having tapering seats surrounding said wedges, an elastic imperforate tube secured at its ends to said valve stem and outer member respectively by being clamped between said wedges and tapering seats and so as to wholly inclose the reduced portion of said outer member and valve, and means for positively holding said outer member and valve in closed position.

7. The combination of an air valve stem with an air passage therethrough and a reduced outer end on said stem, an outer member having a valve at the inner end thereof for opening and closing the passage through the valve stem and having a passage through the outer portion thereof which opens laterally before reaching the valve end of said member, conical wedges on the reduced ends of the valve stem and said outer member outward beyond the discharge end of the passage of said outer member, sleeves on the end of the valve stem and outer member respectively and having tapering seats surrounding said wedges, an elastic imperforate tube secured at its ends to said valve stem and outer member by being clamped between said wedges and tapering seats and so as to wholly inclose the reduced portion of said outer member and valve, and a spiral spring surrounding said tube and secured at its ends to said sleeves and tending to hold the valve closed.

8. The combination of an air valve stem with an air passage therethrough and a reduced outer end on said stem, an outer member having a valve at the inner end thereof for opening and closing the passage through the valve stem and having a passage through the outer portion thereof which opens laterally before reaching the inner portion of said member, conical wedges on the reduced ends of the valve stem and said outer member outward beyond the discharge end of the passage of said outer member, sleeves on the end of the valve stem and outer member respectively, (and having tapering seats surrounding said wedges, an elastic imperforate tube secured at its ends to said valve stem and outer member) by being clamped between said wedges and tapering seats so as to wholly inclose the reduced portion of said outer member and valve, a spiral spring surrounding said tube and secured at its ends to said sleeves and tending to hold the valve closed, and a casing within the dust cap and secured by the valve stem and surrounding the aforesaid movable parts of the device.

9. The combination of an air valve stem with an air passage therethrough and a reduced outer end on said stem, an outer member having a valve at the inner end thereof for opening and closing the passage through the valve stem and having a passage through the outer portion of said member, conical wedges on the reduced ends of the valve stem and said outer member outward beyond the discharge end of the passage of said outer member, sleeves on the ends of the valve stem and outer member respectively, and having tapering seats surrounding said wedges, an elastic imperforate tube secured at its ends to said valve stem and outer member by being clamped between said wedges and tapering seats and so as to wholly inclose the reduced portion of said outer member and valve, a tube carried by said outer member having graduations thereon, and a casing secured to the valve stem and surrounding said graduated tube so that the graduations are visible beyond the outer end of said casing and indicate the said air pressure.

10. The combination of an air valve stem with an air passage therethrough and a reduced outer end on said stem, an outer member having a valve at the inner end thereof for opening and closing the passage through the valve stem and having a passage through the outer portion of said member, conical wedges on the reduced ends of the valve stem and said outer member outward beyond the discharge end of the passage of said outer member, sleeves on the ends of the valve stem and outer member respectively, and having tapering seats surrounding said wedges, an elastic imperforate tube secured at its ends to said valve stem and outer member by being clamped between said wedges and tapering seats and so as to wholly inclose the reduced portion of said outer member and valve, a tube carried by said outer member having graduations thereon, a casing secured to the valve stem and surrounding said graduated tube so that the graduations are visible beyond the outer end of said casing and indicate the air pressure, and a dust cap adapted to screw on said stem and hold the valve in closed position.

In witness whereof, I have hereunto affixed my signature.

CHAUNCEY B. EARNHEART.

Copies of this patent may be obtained for five cents each, by addressing the "Commissioner of Patents, Washington, D. C."